March 16, 1965 C. L. WEIMER ETAL 3,173,733
ELECTRICAL POWER DISTRIBUTION
Filed Oct. 13, 1960 2 Sheets-Sheet 1
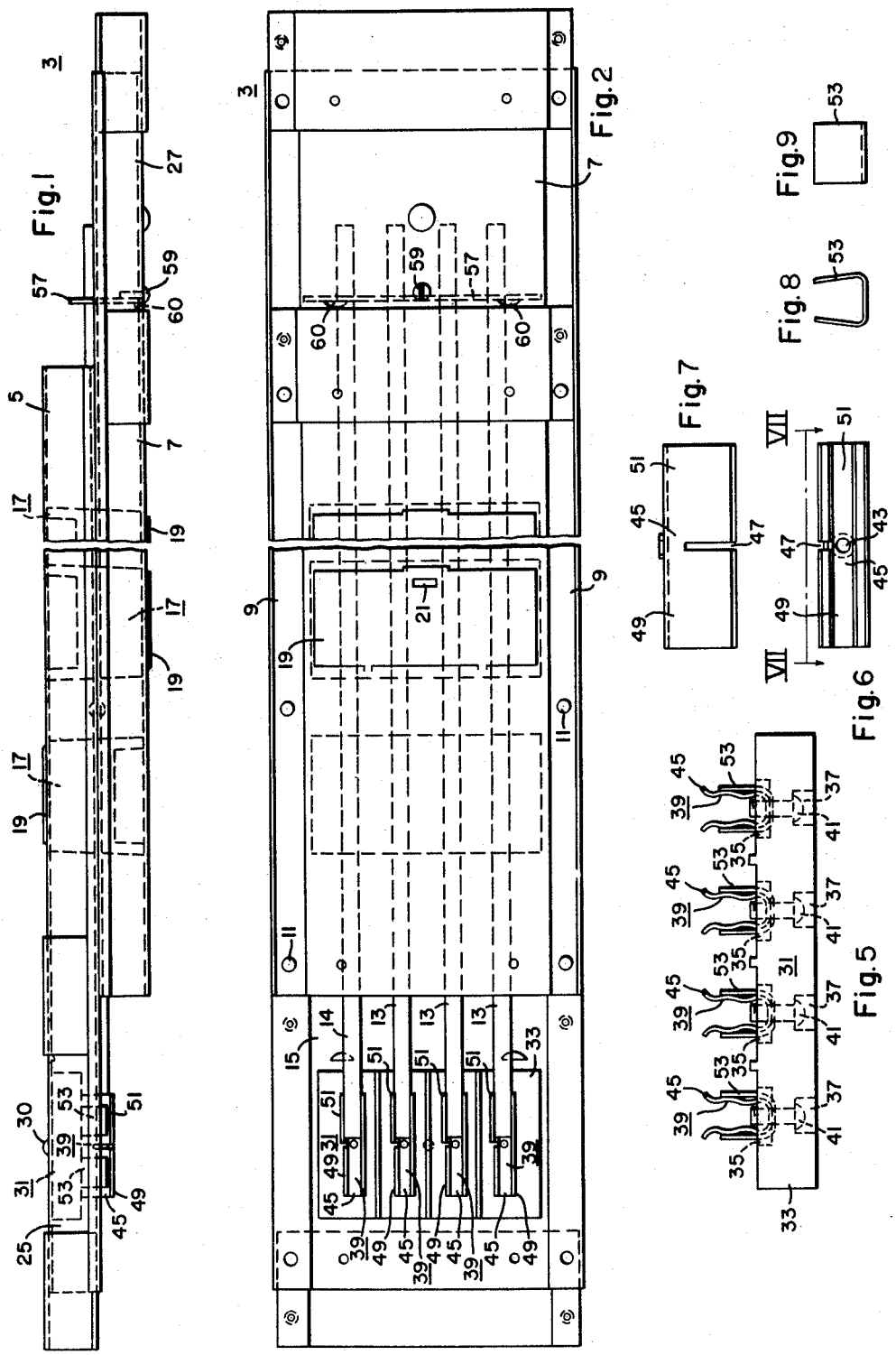

March 16, 1965    C. L. WEIMER ETAL    3,173,733
ELECTRICAL POWER DISTRIBUTION
Filed Oct. 13, 1960    2 Sheets-Sheet 2

United States Patent Office 3,173,733
Patented Mar. 16, 1965

3,173,733
ELECTRICAL POWER DISTRIBUTION
Charles L. Weimer, Patterson Heights, and Samuel S. Fouse, Hopewell Township, Beaver County, Pa., assignors to Westinghouse Electric Corporation, East Pittsburgh, Pa., a corporation of Pennsylvania
Filed Oct. 13, 1960, Ser. No. 62,502
7 Claims. (Cl. 339—22)

This invention relates to bus duct systems of electrical power distribution and more particularly to means for connecting sections of bus duct.

A patent application, Serial No. 369,806, that is a division of this parent application, was filed on May 25, 1964.

Two advantages of a bus duct system of electrical power distribution over a conduit and cable system are ease of installation and the fact that bus duct is fully salvageable. Bus duct is generally constructed in sections of suitable length, which sections are connected together and supported in place at the installation. When there is a need to relocate the system, these sections can readily be dismantled and put back together at the new location.

An object of this invention is to improve upon the above advantages by providing bus duct embodying improved means for connecting sections of the duct together.

Another object of the invention is to provide an improved bus bar connector for connecting the bus bars of two sections of bus duct.

A further object of the invention is to provide bus duct embodying a plurality of sections, the bus bars of which are merely clipped together during installation.

Other objects of the invention will be explained fully hereinafter or will be apparent to those skilled in the art.

In accordance with one embodiment of the invention, the bus bars of two sections of bus duct are connected together by means of a bus bar connector that comprises an insulating block having a plurality of recesses disposed therein in a side-by-side relationship. A generally U-shaped member of conducting material is supported in each of the recesses. This member is elongated, and is split near the center thereof so that the two halves are, to some extent, independently resilient. A generally U-shaped spring clip is disposed over each of the two halves of the generally U-shaped conductor. Each of the spring clips independently biases the legs of its associated half of the U-shaped conductor inwardly. The insulating block is supported at one end of a first of the two sections of bus duct, and an end of each of the bus bars in the first section is forced into one of the halves of each of the clip structures. The sections are connected together by merely forcing one end of each of the bus bars of the second section into the other half of one of the clip structures and fastening the housings together in a suitable manner.

For a better understanding of the nature and objects of the invention, reference may be had to the following detailed description, taken in conjunction with the accompanying drawings, in which:

FIGURE 1 is a side elevational view of a section of bus duct constructed in accordance with the principles of this invention;

FIG. 2 is a bottom view of the bus duct section shown in FIG. 1;

FIG. 5 is an elevational view, on a larger scale, of the bus bar connector seen in FIGS. 1–4;

FIG. 6 is a top view of one of the U-shaped conducting members shown in FIG. 5;

FIG. 7 is a view taken along line VII—VII of FIG. 6;

FIG. 8 is an elevational view of one of the spring members shown in FIG. 5;

FIG. 9 is a side view of the spring member shown in FIG. 8.

Figure 3:
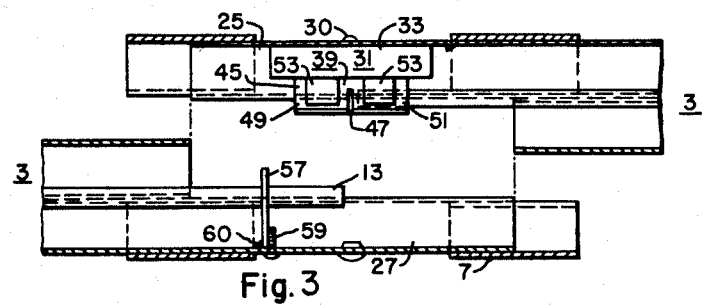
FIG. 3 is a sectional view illustrating the ends of two of the bus duct sections shown in FIG. 1 just prior to their being connected.

Referring to the drawings, there is shown in FIGS. 1 and 2, a section of bus duct 3 comprising a housing comprising a generally V-shaped sheet-steel upper part 5 and a similar lower part 7. The parts 5 and 7 are connected together at flange portions 9 at each of two opposite sides thereof by means of a plurality of bolts 11. Three phase-carrying bus bars 13 and one neutral bus bar 14 are supported within the housing in a generally parallel relationship by means of a plurality of insulating bus bar support members of the plug-in type indicated generally at 17 that are staggered lengthwise on opposite sides of the bus bars. Each of the insulating bus bar supports 17 is provided with four spaced grooves for receiving the four bus bars 13, 14. A knockout portion 19 of the housing 5, 7 is disposed opposite the front side of the bus bar support members. A slot 21 is provided in each of the knockouts 19 for receiving a screwdriver or other tool that is used to pry open the knockout to provide access to the bus bars 13, 14.

As is seen in FIG. 1, the bus duct housing parts 5 and 7 are offset extending out at 25 and 27, respectively. A bus bar connector indicated generally at 31 (FIGS. 1, 2 and 5) is supported in the housing part 5 at the end 25 by means of a screw 30. As is seen more clearly in FIG. 5, the bus bar connector 31 comprises a block of insulating material 33 having four recesses 35 at its inner side and four recesses 37 at its outer side. A spring clip structure indicated generally at 39 is supported in each of the recesses 35 by means of a screw 41 that threads through an opening 43 (FIG. 6) in the base of the spring clip structure. The head of each of the screws 41 is seated within the associated recess 37.

Each of the spring clip structures 39 comprises an elongated generally U-shaped member of conducting material 45 (FIGS. 6 and 7) having a slot 47 in one leg thereof intermediate its ends, which slot divides the member 45 into two independently resilient halves 49 and 51. The legs of each U-shaped conducting member 45 are biased inwardly by means of two spring steel generally U-shaped spring members 53 (FIGS. 5, 8 and 9). The two spring members 53 are disposed on opposite sides of the slot 47 (FIGS. 6 and 7) each biasing the legs of one half 49 or 51 of the conducting member 45 inwardly. With the provision of the slot 47 in the one leg of the U-shaped conducting member 45, and with the use of two spring members 53, the two halves 49 and 51 are, to some extent, independently resilient even though the member 45 is a single conducting member. As is seen in FIG. 2, one of the halves 51 of each of the conducting members 45 of the spring clip structure 39 is clipped onto one of the bus bars 13, 14, and the other half 49 is left open.

Figure 4:
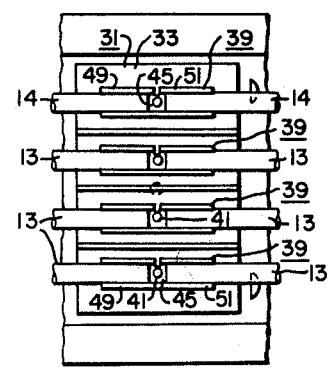
FIG. 4 is a bottom view, with parts broken away, of a connection of two sections of bus duct.

As is seen in FIGS. 3 and 4, when two similar bus duct sections 3 are brought together, the offset end 27 of one of the sections 3 is brought under the offset end 25 of the other section 3, and the bus bars 13, 14 of the lower section are forced into the open halves 49 of the spring clip structures 39 to electrically and phyisaclly connect the bus bars together (FIG. 4).

An insulating bus bar support 57 is provided near the one end 27 of each of the sections 3 providing additional support to the ends of the bus bars 13 and 14 so that the bus bars will not give when the sections are brought together, thereby insuring that the bus bars will be firmly clipped into the spring clip structures 39. The insulating member 57 has a plurality of grooves (not shown)

at its inner side for receiving the bus bars 13, 14 and it is supported in the bus duct housing by means of a screw 59 and two projections 60 that are stamped out of the housing part 7.

From the foregoing description, it is apparent that the invention provides an improved system of electrical power distribution. Improved means is provided for connecting the bus bars of two sections of bus duct together. A novel bus bar connector is captured in position in one section, in which position a plurality of spring clip structures are clipped onto the ends of the bus bars in the section. The bus bars of a second section are merely forced into the spring clip structures to effect a physical and an electrical connection between the bus bars of the two sections.

Since numerous changes may be made in the above-described construction and different embodiments may be made without departing from the spirit and scope of the invention, it is intended that all matter contained in the foregoing description or shown in the accompanying drawings shall be interpreted as illustrative and not in a limiting sense.

We claim as our invention:

1. A section of bus duct comprising, in combination, a housing, a plurality of elongated bus bars supported in the housing in a generally parallel relationship, a bus bar connector supported in the housing at one end thereof, the bus bar connector comprising an insulating block, a plurality of spring clip structures supported on the insulating block, each of said spring clip structures comprising a one-piece generally U-shaped member of conducting material, at least one of the legs of each of said generally U-shaped members being split to divide each of said members into two independently resilient parts, a separate generally U-shaped spring clip biasing the legs of each of said parts of each of said generally U-shaped members toward each other, and one of said parts of each of said generally U-shaped members being clipped onto one end of a different one of each of said bus bars.

2. A section of bus duct comprising a housing, a plurality of elongated bus bars supported in the housing in a generally parallel relationship, a bus bar connector supported in the housing at one end thereof, the bus bar connector comprising an insulating block, a plurality of spring clip structures supported on the insulating block, each of said spring clip structures being electrically connected to a different one of said bus bars, each of said spring clip structures comprising a connecting part adapted to be connected to a similar bus bar of a similar section of bus duct, each of said connecting parts comprising a generally U-shaped conductor and a generally U-shaped spring member disposed over the conductor with the bight portion of the spring member adjacent the bight portion of the conductor and the legs of the spring member adjacent the legs of the conductor whereby the spring member biases the legs of the conductor toward each other, and means securing the generally U-shaped conductor at the bight portion thereof to said insulating block whereby said generally U-shaped spring member is captured at the bight portion thereof between the insulating block and the bight portion of the associated generally U-shaped conductor.

3. In combination, a first section of bus duct comprising a first elongated metallic housing, a first elongated bus bar and a first insulating bus bar support means supporting said first bus bar in said first housing spaced from said first housing, a second section of bus duct comprising a second elongated metallic housing, a second elongated bus bar and a second insulating bus bar support means supporting said second bus bar in said second housing spaced from said second housing, means connecting said first and second sections together comprising bus bar connecting means, means supporting said bus bar connecting means on said first section, said bus bar connecting means comprising an insulating support, a spring clip structure comprising a unitary generally resilient U-shaped member of conducting material, means securing said U-shaped member at the bight portion thereof to said insulating support with the opposite legs of said U-shaped member extending in a direction generally normal to the direction of length of said elongated first bus bar, said U-shaped member at one end thereof being clipped onto said first bus bar and at the other end thereof being clipped onto said second bus bar, said first bus bar flexing the legs of said U-shaped member apart at said one end and said second bus bar flexing the legs of said U-shaped member apart at said other end, and said U-shaped member electrically connecting said bus bars.

4. A section of bus duct comprising, in combination, an elongated metallic housing, a plurality of elongated bus bars, insulating support means supporting said elongated bus bars in said housing in generally parallel relationship spaced from said housing, bus bar connecting means supported in said housing at one end of said housing, said bus bar connecting means comprising an insulating support structure, a plurality of spring clip structures supported on said insulating support structure, each of said spring clip structures comprising a one-piece generally U-shaped member of generally resilient conducting material, said generally U-shaped member comprising a first generally U-shaped part at one end thereof and a second generally U-shaped part at the other end thereof, a separate generally U-shaped spring member biasing the legs of each of said generally U-shaped parts of each of said generally U-shaped members toward each other, and only one of said parts of each of said generally U-shaped members being clipped onto one end of a different one of each of said bus bars with the other part of each of said generally U-shaped members being free to receive a bus bar of a similar section of bus duct.

5. In combination; a first section of bus duct comprising a first elongated metallic housing, a plurality of elongated first bus bars, a first insulating bus bar support means supporting said first bus bars in said first metallic housing in a spaced generally parallel relationship relative to each other and spaced from said first metallic housing, bus bar connecting means supported on said first section of bus duct, said bus bar connecting means comprising insulating connector support means, a plurality of spring clip structures supported on said insulating connector support means, means electrically connecting each of said spring clip structures with a different one of said first bus bars, each of said spring clip structures comprising a connecting part, each of said connecting parts comprising a generally U-shaped generally resilient conducting means supported on said insulating connector support means with the opposite leg portions thereof extending in a direction generally normal to the direction of length of said elongated first bus bars; a second section of bus duct comprising a second elongated metallic housing, a plurality of elongated second bus bars, a second insulating bus bar support means supporting said second elongated bus bars in said second metallic housing in a spaced generally parallel relationship relative to each other and spaced from said second metallic housing; each of said generally U-shaped generally resilient conducting connecting means being clipped onto a different one of said second bus bars with the associated second bus bar flexing the opposite leg portions of the associated generally U-shaped generally resilient conducting connecting means apart whereby said second bus bars are removably electrically connected to said first bus bars.

6. A section of bus duct comprising an elongated metallic housing, a plurality of elongated bus bars, insulating bus bar support means supporting said elongated bus bars in said metallic housing in a spaced generally parallel relationship relative to each other and spaced from said metallic housing, a bus bar connector supported in said housing at one end thereof, said bus bar connector comprising insulating connector support means, a plurality of spring clip structures supported on said insulating connector support means, means electrically connecting each of said spring clip structures with a different one of said bus bars, each of said spring clip structures comprising a connecting part adapted to be connected to a similar bus bar of a similar section of bus duct, each of said connecting parts comprising a generally U-shaped generally resilient member of conducting material and a generally U-shaped spring member supported on said generally U-shaped generally resilient member of conducting material in a nested relationship therewith, means supporting each of said generally U-shaped conducting members at the bight portion thereof to said insulating connector support means with the bight portion of the associated generally U-shaped spring member being captured between the bight portion of the generally U-shaped conducting member and the insulating connector support means, and each of said connecting parts being free at the end of said section with the associated generally U-shaped spring biasing the leg parts of the associated generally U-shaped conducting member toward each other whereby a bus bar of a similar section of bus duct can be removably connected to each of said connecting parts by means of a clip-on type connection.

7. In combination, a first section of bus duct comprising a first elongated metallic housing, a first elongated bus bar and a first insulating bus bar support means supporting said first bus bar in said first housing spaced from said first housing, a second section of bus duct comprising a second elongated metallic housing, a second elongated bus bar and a second insulating bus bar support means supporting said second bus bar in said second housing spaced from said second housing, means connecting said first and second sections together comprising bus bar connecting means, means supporting said bus bar connecting means on said first section, said bus bar connecting means comprising an insulating support, a spring clip structure comprising a unitary generally resilient U-shaped member of conducting material, means securing said U-shaped member at the bight portion thereof to said insulating support with the opposite legs of said U-shaped member extending in a direction generally normal to the direction of length of said elongated first bus bar, one of the legs of said U-shaped member being split to divide said member into two independently resilient end parts, said U-shaped member at one end part thereof being clipped onto said first bus bar and at the other end part thereof being clipped onto said second bus bar, said first bus bar flexing the legs of said U-shaped member apart at said one end part and said second bus bar flexing the legs of said U-shaped member apart at said other end part, and said U-shaped member electrically connecting said bus bars.

References Cited by the Examiner
UNITED STATES PATENTS

| 460,725 | 10/91 | Markle | 339—23 X |
|---|---|---|---|
| 2,170,285 | 8/39 | Fisher et al. | 339—79 |
| 2,292,320 | 8/42 | Hammerly | 339—259 |
| 2,309,972 | 2/43 | Messing | 339—76 |
| 2,499,297 | 2/50 | Buchanan | 339—258 |
| 2,671,887 | 3/54 | Wellman | 339—22 |
| 2,932,686 | 4/60 | Herrmann | 174—88 |
| 2,942,225 | 6/60 | Ricci et al. | 339—22 |
| 2,943,292 | 6/60 | Herrmann et al. | 339—79 |
| 2,946,034 | 7/60 | Washburn | 339—22 |
| 2,966,542 | 12/60 | Shields | 174—88 |

FOREIGN PATENTS 946,911   8/56   Germany.

JOSEPH D. SEERS, *Primary Examiner.*
RUDOLPH V. ROLINEC, *Examiner.*